US005895519A

United States Patent [19]
Lorimer

[11] Patent Number: 5,895,519
[45] Date of Patent: Apr. 20, 1999

[54] METHOD AND APPARATUS FOR PURIFYING HYDROGEN GAS

[75] Inventor: D'Arcy H. Lorimer, Pismo Beach, Calif.

[73] Assignee: SAES Pure Gas, Inc., San Luis Obispo, Calif.

[21] Appl. No.: 08/820,881

[22] Filed: Mar. 21, 1997

Related U.S. Application Data

[60] Provisional application No. 60/014,459, Mar. 28, 1996.

[51] Int. Cl.$^6$ ............................ B01D 53/04; B01D 53/22
[52] U.S. Cl. .................. 95/56; 95/116; 96/4; 96/108; 96/134; 96/136
[58] Field of Search .................. 95/55, 56, 116; 96/4, 7–11, 108, 134, 136; 206/0.7

[56] References Cited

U.S. PATENT DOCUMENTS

| | | | |
|---|---|---|---|
| 3,238,700 | 3/1966 | Cohn | 95/56 |
| 3,336,730 | 8/1967 | McBride et al. | 95/56 |
| 3,398,504 | 8/1968 | Rubin | 95/116 X |
| 4,135,621 | 1/1979 | Turillon et al. | 96/4 X |
| 4,306,887 | 12/1981 | Barosi et al. | 55/68 |
| 4,528,003 | 7/1985 | Dittrich et al. | 55/158 |
| 4,701,187 | 10/1987 | Choe et al. | 95/55 X |
| 4,707,342 | 11/1987 | Iniotakis et al. | 95/55 X |
| 4,867,762 | 9/1989 | Pierini et al. | 95/116 |
| 4,892,142 | 1/1990 | Labaton | 95/56 X |
| 4,976,938 | 12/1990 | Knize et al. | 95/116 X |
| 5,124,500 | 6/1992 | Clark et al. | 95/116 X |
| 5,205,841 | 4/1993 | Vaiman | 96/11 X |
| 5,238,469 | 8/1993 | Briesacher et al. | 95/116 X |
| 5,456,740 | 10/1995 | Snow et al. | 96/11 |
| 5,489,327 | 2/1996 | Otsuka et al. | 95/116 |
| 5,556,603 | 9/1996 | Succi et al. | 96/121 X |

FOREIGN PATENT DOCUMENTS

| | | | |
|---|---|---|---|
| 2548734 | 5/1977 | Germany | 95/55 |
| 2557908 | 6/1977 | Germany | 95/55 |
| 0282764 | 9/1990 | Germany | 95/116 |
| 0 381 631 | 8/1990 | Italy . | |
| 62017001 | 1/1987 | Japan . | |
| 62-176902 | 8/1987 | Japan | 95/116 |
| 63072321 | 4/1988 | Japan . | |
| 01-298001 | 12/1989 | Japan | 96/11 |
| 03077626 | 4/1991 | Japan . | |
| 5000801 | 1/1993 | Japan . | |
| 1 572 796 | 8/1980 | United Kingdom . | |
| 0 015428 | 9/1980 | United Kingdom . | |
| 2177079 | 1/1987 | United Kingdom | 95/116 |

OTHER PUBLICATIONS

Chemical Abstracts, vol. 108, No. 18, May 2, 1988 Columbus, Ohio, US; abstract No. 153015, XP002034458.

*Primary Examiner*—Robert Spitzer
*Attorney, Agent, or Firm*—Hickman & Martine, LLP

[57] ABSTRACT

A method and apparatus for providing substantially pure hydrogen gas from a mixture of hydrogen and gaseous contaminants includes passing a gaseous mixture containing hydrogen gas and gaseous impurities through a purifier to form substantially pure hydrogen gas which is stored in a porous storage material including a getter material. The substantially pure hydrogen gas can be released from the porous storage matrix as desired. Preferably the purifier and porous storage matrix are separated by a thermally insulating matrix. The apparatuses can be combined in a serial configuration to provide a stream of substantially pure hydrogen gas at a substantially constant pressure.

70 Claims, 7 Drawing Sheets

METHOD AND APPARATUS FOR PURIFYING HYDROGEN GAS

CLAIM OF PRIORITY TO PENDING PROVISIONAL APPLICATION

This application claims under 35 U.S.C. § 199(e) from U.S. Provisonal Patent Application No. 60/014,459, filed on March 28, 1996, entitled METHOD AND APPARATUS FOR PURIFYING HYDROGEN GAS by inventor D'Arcy H. Lorimer, the disclosure of which is incorporated herein by reference for all purposes.

BACKGROUND OF THE INVENTION

1. The Field of the Invention

The present invention relates to methods and apparatus for purifying and storing gases. More particularly, the present invention is related to methods and apparatus for purifying and storing hydrogen gas.

2. The Relevant Art

Hydrogen is one of the most ubiquitous elements in the universe as well as the most reactive, forming more compounds than any element in the periodic table including carbon. Hydrogen gas of high purity, having contaminants at part-per-billion concentrations, is used commonly in semiconductor fabrication and other "high-tech" applications.

High purity hydrogen gas is produced on an industrial scale by one of several techniques. The most common method of manufacture is the catalytic steam-hydrocarbon reforming process in which hydrocarbons from natural gas or refinery feedstock are reacted catalytically with water at elevated temperatures to form carbon monoxide (CO) and hydrogen gas ($H_2$), as illustrated below where propane ($C_3H_8$) is the feedstock hydrocarbon:

$$C_3H_8 + 3H_2O \rightarrow 3CO + 7H_2.$$

The carbon monoxide can be further converted to carbon dioxide ($CO_2$) and hydrogen.

An alternative method involves the production of hydrogen as a by-product of the production of chlorine and sodium hydroxide (NaOH) by the well known brine electrolytic process in which the chloride ion present in aqueous sodium chloride is oxidized to form chlorine gas ($Cl_2$) in addition to $H_2$ and NaOH. In another method, useful for small scale generation of hydrogen, an equimolar mixture of methanol ($CH_3OH$) and water ($H_2O$) is vaporized and passed over a "base-metal chromite" type catalyst at 400° C. wherein the mixture is cracked into hydrogen and carbon monoxide. The carbon monoxide subsequently reacts with the steam to produce carbon dioxide and more hydrogen.

Regardless of the method of production, the hydrogen gas typically must be purified to remove gaseous impurities such as nitrogen ($N_2$). Nitrogen is especially prevalent in hydrogen produced by electrochemical methods. Commonly, a technique known as cryogenic absorption is used to remove nitrogen residues from hydrogen gas by precipitating the nitrogen and other gas impurities from the impure hydrogen gas mixture. In the cryogenic absorption process, the contaminated hydrogen gas is passed over charcoal immersed in a bath of liquid nitrogen. Although this method provides hydrogen gas having impurities on the order of parts-per-billion (ppb), the method is very complex and expensive to operate.

Other methods have focused on applying "getters" to purify hydrogen gas. As used herein, the terms "getter" and "scavenger" refer to substances that bind gas molecules by a "sorption" process, i.e., by adsorption or absorption. Unfortunately, using getters to sorb nitrogen and other impurities is impractical for nitrogen concentrations greater than about 20 parts-per-million (ppm) to 50 ppm due to depletion of the getter materials. In particular, oxygen ($O_2$) $N_2$, and $H_2O$ contaminants commonly found in hydrogen feedstocks quickly contaminate the getter materials and degrade their performance.

Attempts to store hydrogen in getters or other hydride forming materials and "flush" the non-sorbed impurities have also proved inefficient as such systems must be capable of absorbing large amounts of energy released during the sorption process and yet retain the capability to produce the elevated temperatures required to release the hydrogen from the getters after the impurities have been expelled from the system. Such systems are therefore highly inefficient in terms of energy use.

Additional factors complicating this process include difficulties in ensuring that the "void volume" remaining after sorption of the hydrogen is sufficiently free of residual impurities, and the loss of hydrogen gas due to leaks in the system. Purging the void volume is critical to producing purified gas, as the degree of gas purity is limited by the amount of impurities remaining in the void volume when the purified gas is released from the getter material for use. Thus, the void volume must be rigorously purged with gas that is at least as pure as the gas of desired purity. The purge gas must then either be itself purified again, or released from the system. Thus, it will be seen that present getter purification methodologies waste purified gas. For example, as much as 10–20% of purified hydrogen may be lost through purging to achieve gas purities on the order of 10–50 ppb. Still more purified hydrogen gas would be lost in achieving purification levels on the order of 1 ppb. The result of this limitation is that present methods of purification employing getters can provide only limited purification economically, and are used to reduce impurity concentrations to between about 500 ppb–100 ppb. These methods are not capable of providing hydrogen gas having impurity concentrations of less than about 10 ppb economically. Furthermore, getter purification technologies are also not economical for hydrogen gas having large concentrations of nitrogen, as exposure to nitrogen exhausts getter capacity quickly. These limitations with existing getter methodologies are especially difficult for third world countries that are attempting to develop modern electronics industries that require sources of highly purified hydrogen gas but cannot afford the expense associated with cryogenic methods of hydrogen purification.

Still another method for purifying hydrogen gas uses a palladium or palladium alloy diffuser separator to separate hydrogen preferentially from mixtures of gases, such as those described in U.S. Pat. Nos. 3,368,329 and 3,534,531 to Eguchi, et al., each of which is incorporated herein by reference. Generally, impure hydrogen gas is passed through a palladium or palladium alloy membrane (ie., a continuous walled metal matrix structure that functions as a diffusion barrier to selectively allow the diffusion of hydrogen through the metal matrix), or packed small-diameter, thin-walled tubes of palladium or palladium alloy, to purify the hydrogen gas. Unfortunately, such methods require the use of high pressures (about 6 Bar) to provide flow rates which are economical for use in semiconductor fabrication processes or other processes where a steady flow of hydrogen gas is required. Furthermore, the need to maintain a large pressure differential across the metal purifier requires the use of pumps which introduce additional sources of leakage and contamination. Because of the high pressure requirement, palladium and palladium alloy methods of purification are practical only for point-of-use purification, e.g., in the laboratory, or for applications where high flow rate is not a requirement.

Thus, there remains a need for economical and reliable methods and apparatus for purifying hydrogen gas on a large scale and at a flow rate which is adequate for modern industrial requirements.

SUMMARY OF THE INVENTION

The present invention includes a method and apparatus for providing substantially pure hydrogen gas. In one important aspect, the method and apparatus of the present invention are capable of providing a source of substantially pure hydrogen gas sufficient for use in semiconductor processing.

In one aspect, the present invention includes a method of purifying a gaseous mixture containing hydrogen and various gaseous contaminants to produce and store substantially purified hydrogen gas. In a first step, a gaseous mixture containing hydrogen is passed through a membrane purifier to produce substantially purified hydrogen gas. The substantially purified hydrogen gas is then introduced into a porous storage matrix including a getter material under conditions effective to intercalate and store the substantially purified hydrogen gas.

In another aspect, the present invention includes a hydrogen gas purifying and storage system comprising a hydrogen membrane purifier effective to provide substantially pure hydrogen gas in gaseous communication with a porous storage matrix, which storage matrix includes a getter material.

In some embodiments, the getter material comprises zirconium (Zr), vanadium (V), iron (Fe), titanium (Ti), hafnium (Hf), uranium (U), thorium (Th), tungsten (W), tantalum (Ta), niobium (Ni), aluminum (Al) and alloys thereof. In one embodiment, the getter is a zirconium-vanadium-iron alloy having a weight composition such that the percentage of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe. Another useful getter material is an alloy comprised of 84% Zr and 16% Al. In one embodiment, the purifier is a palladium or palladium alloy. In another embodiment, the palladium alloy is a palladium-silver alloy which contains less than about 20% silver.

In still another embodiment, a thermally insulating porous matrix is disposed between the purifier and storage matrix so that the above-described palladium-containing material can be operated at a temperature different from the temperature of the storage matrix. According to one embodiment the porous matrix comprises a porous, thermally insulating material capable of gas transmission such as silica, porous quartz, or alumina.

In yet another embodiment, the present invention includes a system for providing a substantially continuous stream of substantially pure hydrogen gas. The system includes a gas inlet for receiving a gaseous mixture containing hydrogen and gaseous impurities coupled with a plurality of the above-described hydrogen purifying and storage systems. The inlet is further coupled with means for selectively introducing the gaseous mixture to the purification and storage systems. The purification and storage systems are coupled with an outlet which is also coupled with means for introducing selectively purified hydrogen gas to the outlet. In yet another embodiment, the present invention includes a method for supplying a substantially continuous stream of substantially pure hydrogen gas using the above-described system.

In still another embodiment, the present invention provides methods and systems for producing semiconductor devices using substantially purified hydrogen gas formed using methods and apparatus in accordance with the present invention.

These and other aspects and advantages of the present invention will become apparent when the following specification is read in conjunction with the accompanying drawings.

DESCRIPTION OF SPECIFIC EMBODIMENTS

The present invention includes a method and apparatus for producing and storing substantially purified hydrogen gas from a gaseous mixture containing hydrogen and various gaseous contaminants using a synergistic combination of a purifier combined with a porous storage matrix, which matrix includes a getter material. Using such a combination, substantially pure hydrogen gas can be produced and stored efficiently and economically. As used herein, the terms "substantially pure" and "substantially purified" refer to gases having concentrations of impurities of less than about one part-per-million (ppm), more specifically less than about one hundred parts-per-billion (ppb), and, still more specifically, between about fifty ppb and one ppb. Yet more specifically, the impurity concentrations are less than about ten ppb, and, still more specifically, less than about 100 parts-per-trillion (ppt).

Figure 1:
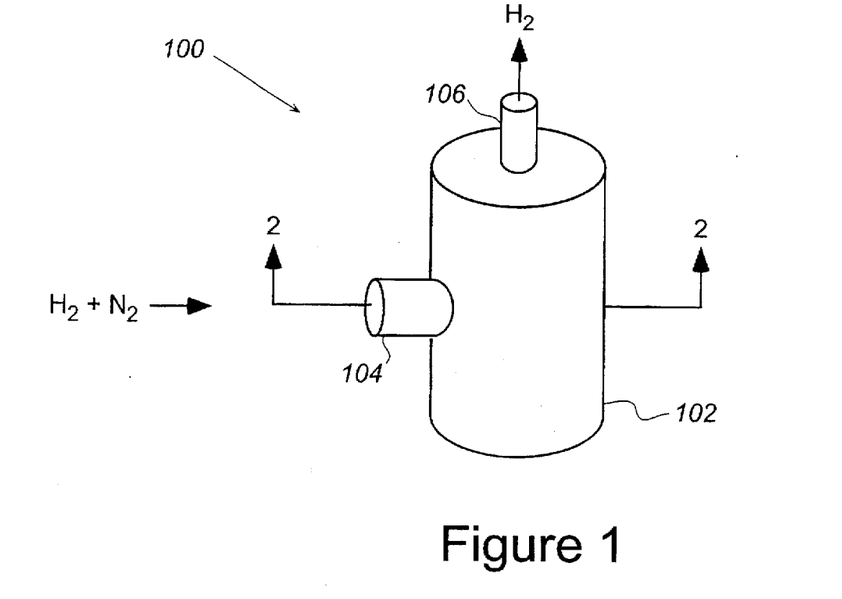
FIG. 1 is an illustration of an apparatus for purifying hydrogen gas in accordance with the present invention.

Referring to FIG. 1, a hydrogen gas purifying and storage apparatus in accordance with the present invention is illustrated at 100. The apparatus includes a central purification/storage unit 102 which further includes a gas inlet 104, through which gaseous mixtures containing hydrogen and gaseous impurities such as nitrogen are introduced to the apparatus, and outlet 106 from which substantially purified hydrogen gas is released. The dimensions, materials and methods of constructing the gas purifying and storage apparatuses of the present invention can be determined by those having skill in the art of gas purification using well-known techniques. Among the factors to be considered are the storage capacity of the storage unit, the ability to extract stored, purified gas from the storage unit, and the diffusion properties of the storage unit.

Purification/storage unit 100 will generally contain further elements that are not shown, such as safety devices to prevent the accumulation of undesirable gas pressures within the unit, temperature and pressure sensors, and links to remote control installations. These elements and the materials, and the design and construction of such units are well known to those of skill in the art.

The operation of the apparatus of the invention is described with reference to FIG. 2, which illustrates at 200 a cross section of apparatus 100 taken along the line 2—2 of FIG. 1. Impure gas enters the apparatus through inlet 104 into a dead space 202 which dead space is formed between the wall of the central purification/storage unit 102 and purifier 204. In one embodiment, purifier 204 is in communication with porous thermally insulating matrix 208 which matrix separates purifier 204 from porous storage matrix 210, which storage matrix includes a getter material as described in greater detail below. Outlet 106 comprises a centrally disposed channel 209 stored, purified hystored, purified hydrogen gas is released from storage matrix 210.

Purifier 204 can be any membrane or diffusion membrane effective for separating hydrogen gas from impurity gases, including metal diffuser separators comprising materials such as palladium and palladium alloys that are effective for separating hydrogen gas from impurities, e.g., palladium-silver or palladium-tantalum alloys. In one embodiment, the purifier is a metal diffuser separator comprising a membrane of palladium or palladium-silver alloy. More preferably, the diffuser separator comprises a palladium-silver alloy, especially a palladium-silver alloy containing less than about 20% silver, as such alloys avoid unwanted hydride formation and have increased hydrogen permeability. Such membrane diffuser separators may comprise one or more layers of membrane layered concentrically around the central axis of the apparatus, each layer being substantially continuous (i.e., a membrane having no creases, holes or pinholes). Such materials can be purchased commercially (e.g., Engelhard, Johnson-Mathey) and handled using standard techniques.

In one embodiment, the purifier includes means for heating and cooling the membrane whereby the temperature of the purifier can be controlled independently of the temperature of the storage unit as described below. Those having skill in the gas purification arts will appreciate that maintaining the membrane at an elevated temperature is desirable to promote purifier longevity and efficiency. For example, it is well known that at elevated pressures palladium metal will absorb $H_2$ to form $\alpha$-phase and $\beta$-phase metal hydrides. Formation of the latter phase is undesirable as it causes the metal lattice to undergo an expansion in volume (perhaps by as much as 10%), leading potentially to distortions and hardening of the metal and decreased performance. Under such conditions the metal may even crack, allowing contamination of the hydrogen gas. The formation of the undesired $\beta$-phase can be avoided, e.g., by maintaining the metal at a temperature greater than about 300 ° C. or by using a palladium-silver alloy containing about 20% silver. It will be appreciated that means for heating and cooling the membrane are well known to those having skill in the art of gas purification.

Figure 2:
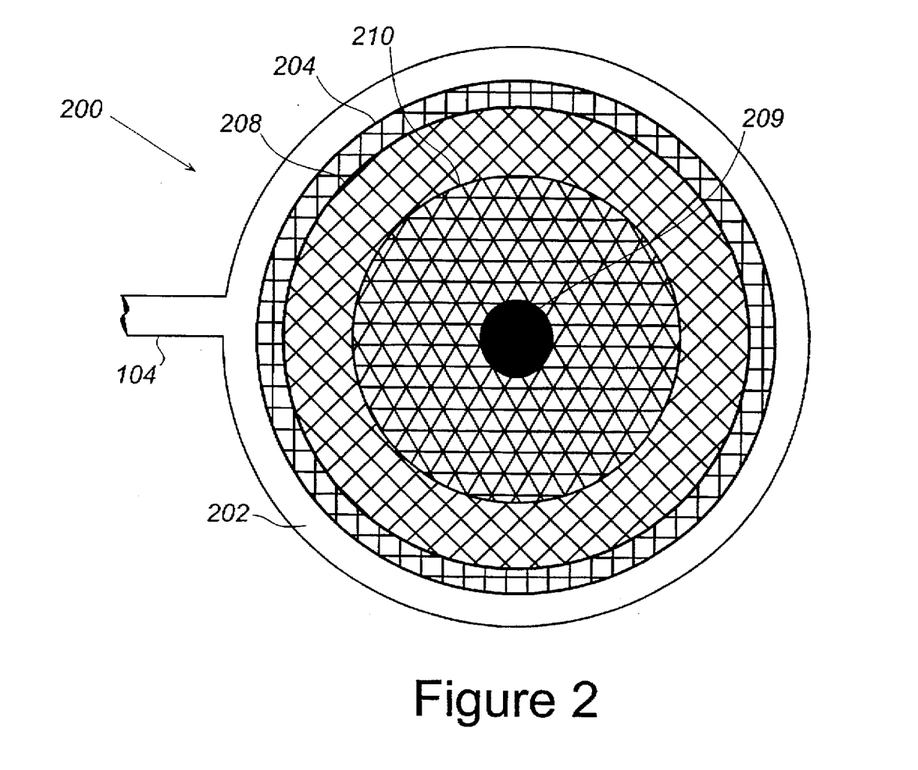
FIG. 2 is a cut-away illustration of one embodiment of the apparatus of the invention shown in FIG. 1, taken along the line 2–2 of that Figure.

With continued reference to FIG. 2, purifier 204 is preferably isolated thermally from storage matrix 210 so that the temperatures of each of the purifier and storage matrix can be , regulated individually. In one embodiment, such separation is achieved by disposing porous thermally isolating matrix 208 between the purifier and storage matrix. The thermally isolating matrix should also be effective to allow the passage of gas from the purifier into the storage matrix. Materials that are effective for both thermal isolation and gas passage include, but are not limited to, silica, alumina, and porous quartz such as sold commercially under the tradename "Vycor®" from Corning.

Storage matrix 210 preferably comprises a getter or other sorbtive material effective to abstract hydrogen which has passed through purifier 204 and, optionally, thermal isolation matrix 208. Typical getter materials include, among others, zirconium (Zr), titanium (Ti), hafnium (Hf), uranium (U), thorium (Th), tungsten (W), tantalum (Ta), niobium (Nb) and their alloys. In one embodiment, these materials include alloys of zirconium or titanium with one or more elements including, but not limited to, vanadium (V), nickel (Ni), iron (Fe), manganese (Mn) or aluminum (Al), optionally including additional elements such as chromium (Cr) and/or cobalt (Co).

In one embodiment, the getter material comprises a zirconium-vanadium-iron ternary alloy having a weight composition such that the percentages of weights of the three metals when plotted on a ternary composition diagram fall within a triangle whose vertices lie at a) 75% Zr/ 20% V/ 5% Fe; b) 45% Zr/ 20% V/ 35% Fe; and c) 45% Zr/ 50% V/ 5% Fe. More preferably, the getter material comprises a ternary alloy having a composition of 70% Zr/ 24.6% V/ 5.4% Fe by weight, which ternary alloy is sold under the tradename "St 707" by SAES Getters, S.p.A. (Milan, Italy). Such materials and their preparation are described in U.S. Pat. No. 4,312,669 to Boffito, et al., and 4,269,624 to Figini, both of which are incorporated herein by reference. Another useful getter material is an alloy comprised of 84% Zr and 16% Al. This material is sold under the tradename "St 101" by SAES Getters, S.p.A.

Yet another useful getter material includes a mixture of the above-described St 707 material and zirconium powder in mixtures comprising between about 4 parts Zr to about 1 part ternary alloy and 1 about part Zr to about 6 parts ternary alloy by weight; preferably between about 2 parts zirconium to about 1 part ternary alloy and about 1 part zirconium to about 2 parts ternary alloy by weight. These materials are available commercially under the tradename "St 172" from SAES Getters S.p.A. (Milan, Italy). This material is also described in British Patent No. GB 2,077,487, which is incorporated herein by reference. Still other useful getter materials are described in U.S. Pat. Nos. 3,926,832; 4,071, 335; 4,306,887; 4,839,085; 4,907,948; and 5,242,559; and in German patents DE 3,031,471 Al and 3,023,770 Al, both to Bernauer, et al. Each of these patents is incorporated herein by reference.

The above-described getter materials may be formed into a variety of getter elements to be used in storing the purified hydrogen gas. In one embodiment, the getter materials are coated onto a ribbon which is formed into a pleated or concertina shape to increase the available surface area of the getter material relative to the volume occupied by the material such as described in U.S. Pat. No. 4,137,012 to della Porta, et al., entitled "Modular Getter Pumps" and which is incorporated herein by reference. In still another embodiment, the getter material is formed into porous, sintered blades such as those described in PCT Application Ser. No. WO 94/02957, entitled "High Capacity Getter Pump", naming Ferrario, et al., as inventors and which is incorporated herein by reference. The getter material can also be pressed into open reticulated network carrier strips as described in U.S. Pat. No. 4,977,035 to Travis, et al., which is incorporated herein by reference.

In another embodiment, getter materials and, in particular, porous, sintered getter materials such as described in co-pending U.S. patent application Ser. No. 08/477,100, now abandoned naming Conte and Carella, as inventors, and U.S. patent application Ser. No. 08/521,943, naming Lorimer, et al., as inventors, can be used. Porous getter materials tend to be preferable to less porous materials in that they tend to have greater sorption capabilities. Such porous getter materials can be prepared in accordance with the descriptions in U.S. Pat. No. 4,428,856, which describes the preparation of porous getter bodies from a mixture of powders including titanium, titanium hydride and a refractory metal chosen from the group consisting of tungsten, molybdenum, niobium and tantalum; British Patent Application No. GB 2,077,487A, which describes the preparation of porous getter material from a mixture of zirconium and the above-described ternary alloy; German Patent No. 2,204,714 which describes the preparation of a porous getter material comprising a mixture of zirconium and graphite powders; and the above-cited U.S. patent application Ser. No. 08/477,100, which describes a process for preparing disks of non-evaporable getter material having good porosity, gas sorption rate and capacity, as well as desirable mechanical properties. Each of these references is incorporated herein by reference in its entirety and for all purposes.

In yet another embodiment, the getter material is provided in the form of a bed which comprises a getter material that is in a powdered or pelletized form. Such beds can be formed using methods known to those of skill in the metallurgy and getter arts. The bed can further contain cooling and/or heating coils, or other means of temperature control, arranged within and/or near the bed to control the temperature of the bed and hence the rate of sorption and desorbtion of the hydrogen gas from the getter material. The control of sorption and desorbtion of gases from getter material by manipulating the temperature of the getter material will be familiar to those having skill in the getter and gas purification arts.

Figure 3:
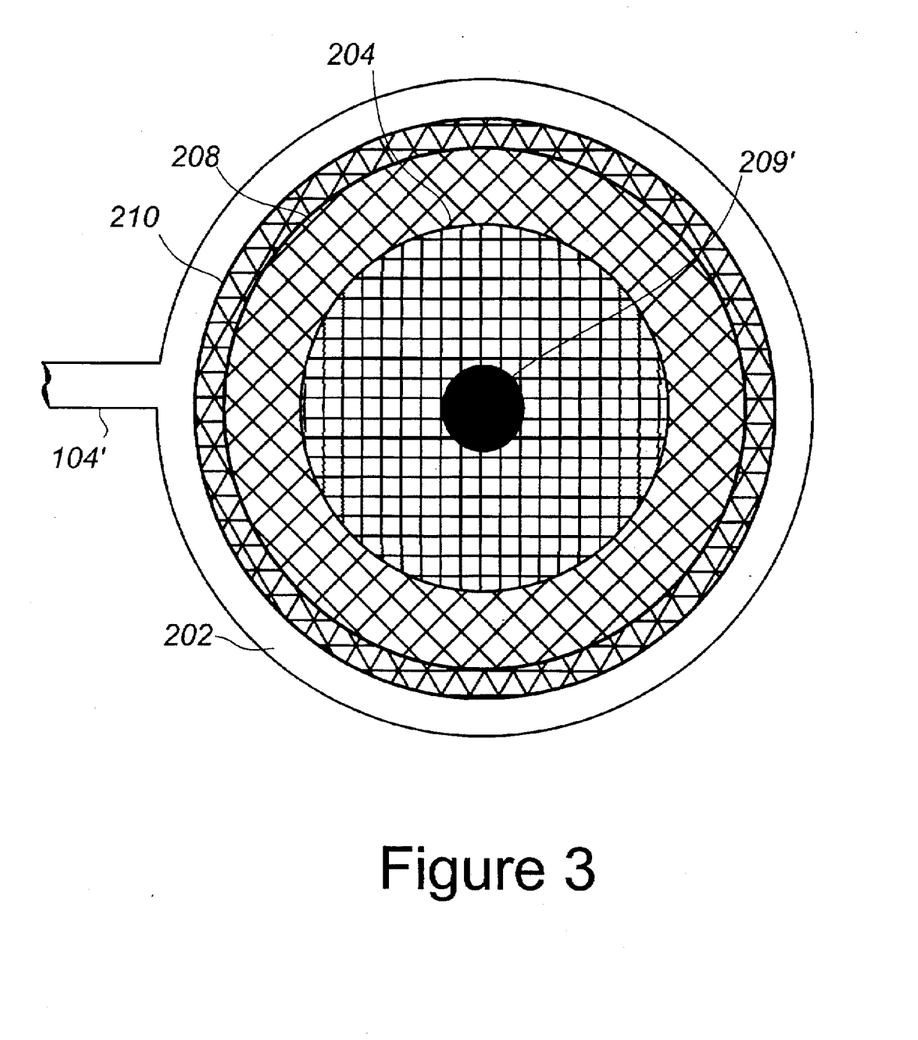
FIG. 3 is a cut-away illustration of another embodiment of the apparatus of the invention.

Those of skill in the art will appreciate that the embodiment just described with respect to FIG. 2 is but one of several possible equivalent alternate embodiments. One such alternate embodiment is illustrated in FIG. 3. There, a cross section of apparatus 100 shown in FIG. 1 is displayed, but wherein the direction of gas flow is reversed. Thus, impure gas introduced into the apparatus at a centrally disposed channel 209' whereupon the impure gas flows through purifier 204. In one embodiment a thermally isolating porous matrix 208 is disposed between purifier 204 and porous storage matrix 210. Dead volume 202, between storage matrix 210 and outer wall 102, provides access to outlet 104' from which substantially purified hydrogen can emerge from the apparatus.

Figure 4:
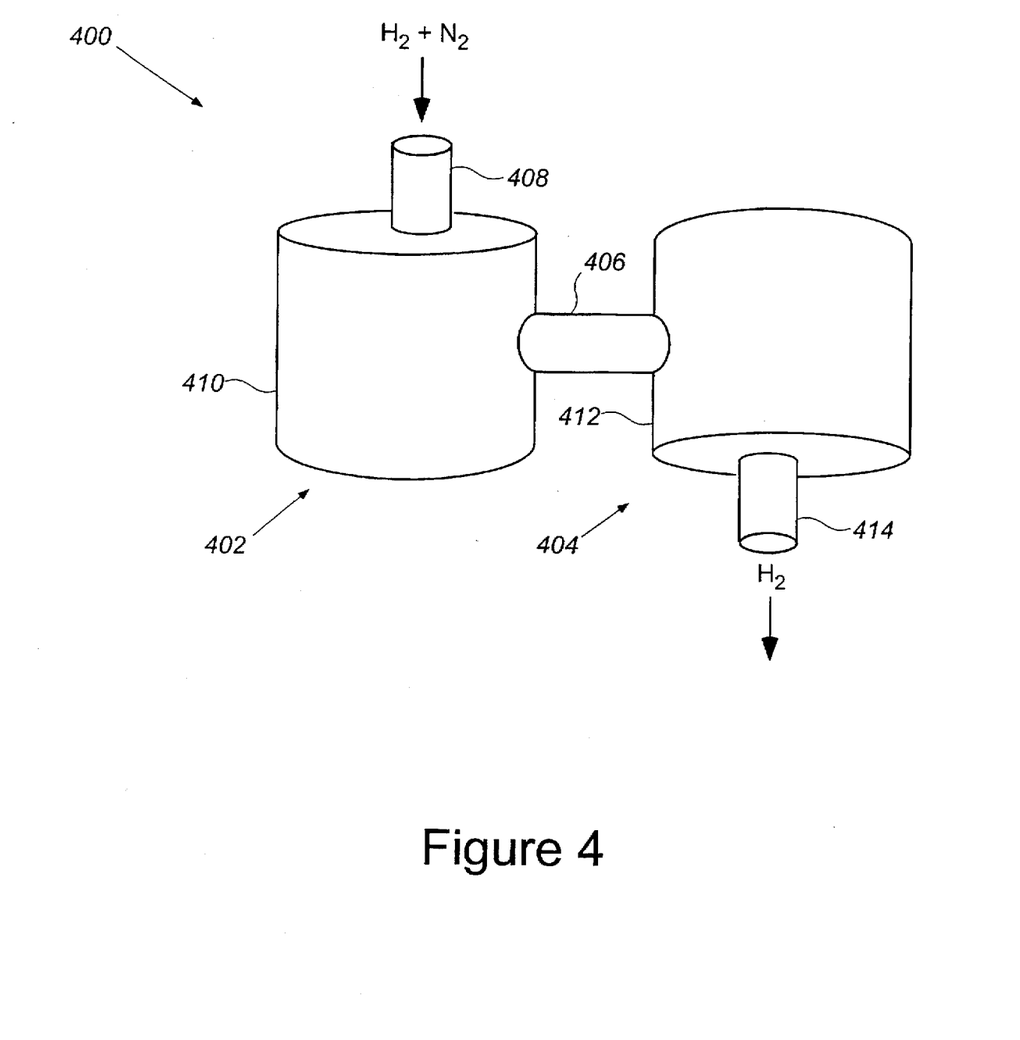
FIG. 4 illustrates an alternative embodiment of an apparatus for purifying hydrogen gas in accordance with the present invention.

A second alternative embodiment is illustrated in FIG. 4, at 400. There, a purification apparatus 402, containing materials for purifying contaminated hydrogen gas as described above, is connected to separate storage apparatus 404 which storage apparatus contains a porous storage matrix as just described. The two apparatuses are separated by a thermally isolating conduit 406, which connection is effective to deliver a stream of substantially purified gas from purification apparatus 402 to storage apparatus 404 without substantial contamination or leakage of the substantially purified gas. Conduit 406 may further include means for adjusting the temperature of the gas as it passes between apparatuses 402 and 404, such as a cooling jacket or heating elements, in addition to flow monitoring and valve means for controlling gas flow. Purification apparatus 402 includes an inlet 408 for receiving hydrogen gas to be purified which inlet is attached to purification unit 410. Similarly, storage apparatus 404 includes a storage unit 412 and an outlet 414 from which substantially purified hydrogen gas can be released. The materials and construction of such apparatus will be familiar to those having skill in the gas purification arts.

Figure 5A:
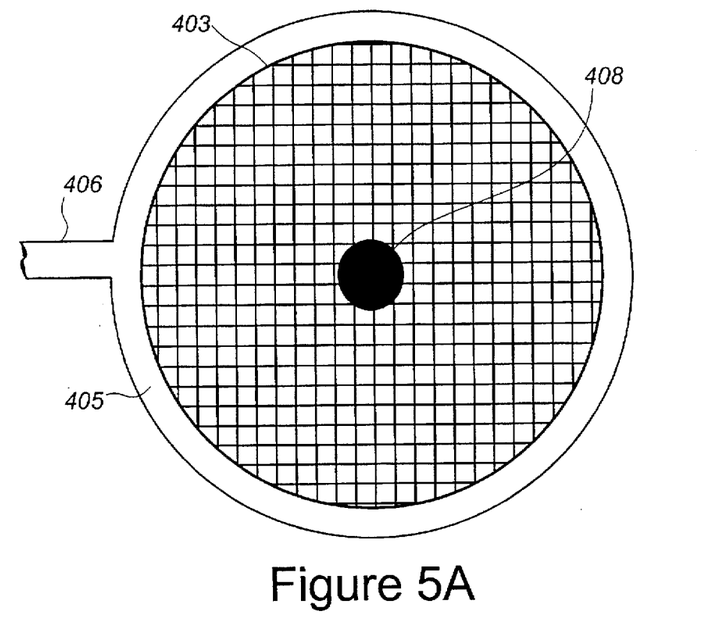
FIGS. 5A and 5B are cut away illustrations of the apparatus shown in FIG. 4.

The interior of purification apparatus 402 is illustrated in greater detail in FIG. 5A as a cut away view. The arrangement of elements within the purification apparatus is substantially similar to that shown in FIGS. 2 and 3. However, the thermal isolation matrix and the storage matrix have been removed, leaving only purifier 403 which purifies gas received through centrally disposed gas inlet 408. The purified gas leaves the purification apparatus by flowing through purifier 403 into dead space 405, which dead space is formed between the purifier and the outer wall of purification 410. The gas then flows through the dead space into conduit 406 whereupon it enters the thermally isolating connection to storage apparatus 404.

Figure 5B:
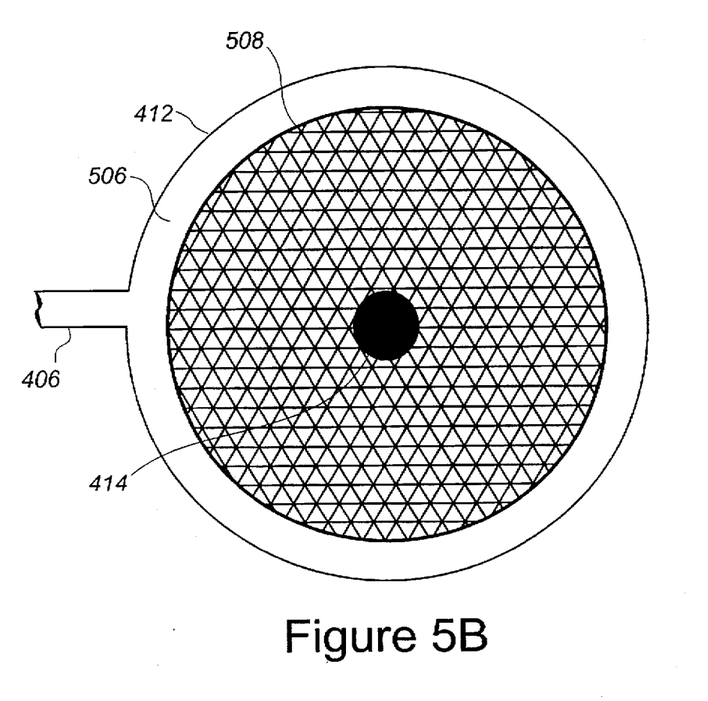

Storage apparatus 404 is illustrated in greater detail in FIG. 5B. Again, the arrangement and characteristics of the elements of storage apparatus 404 are substantially similar to those discussed above with respect to FIGS. 2 and 3. Purified gas flows through conduit 406 into dead volume 506 formed between storage matrix 508 and the outer wall of storage unit 412. As described above, the gas diffuses into the storage matrix whereupon it can be withdrawn through centrally disposed outlet 414 upon release from the matrix, e.g., by heating, through a centrally disposed channel in the storage matrix.

During operation, hydrogen gas containing impurities, such as nitrogen, is introduced to the purifier whereupon the impurities are removed selectively by the purifier and substantially pure hydrogen gas passes on to the storage matrix. In one embodiment, the purifier is a palladium or palladium-silver diffusion separator maintained at a temperature effective to provide efficient purification of the gas, e.g., 300–400° C. for a palladium purifier. In one embodiment, the purified hydrogen gas passes through a thermal isolation matrix or other thermally isolating connection to the storage matrix, which storage matrix comprises a getter material. Upon contacting the getter material, the hydrogen atoms diffuse into the hydrogen sorbing material bulk more quickly than any remaining impurities and distribute almost uniformly within the bulk. Thus, it will be appreciated that the storage matrix may also function to remove any remaining impurities in addition to providing a hydrogen reservoir. For example, it is wellknown that the reaction of hydrogen with a hot palladium membrane can produce methane ($CH_4$) which introduces an impurity to be removed from the hydrogen gas. However, using a getter storage matrix as described herein allows for the removal of such methane, either by reaction between the getter matrix and methane to liberate hydrogen, or by the preferential sorption of hydrogen by the getter matrix thereby leaving any methane impurities in the void volume which can be purged.

Figure 6:
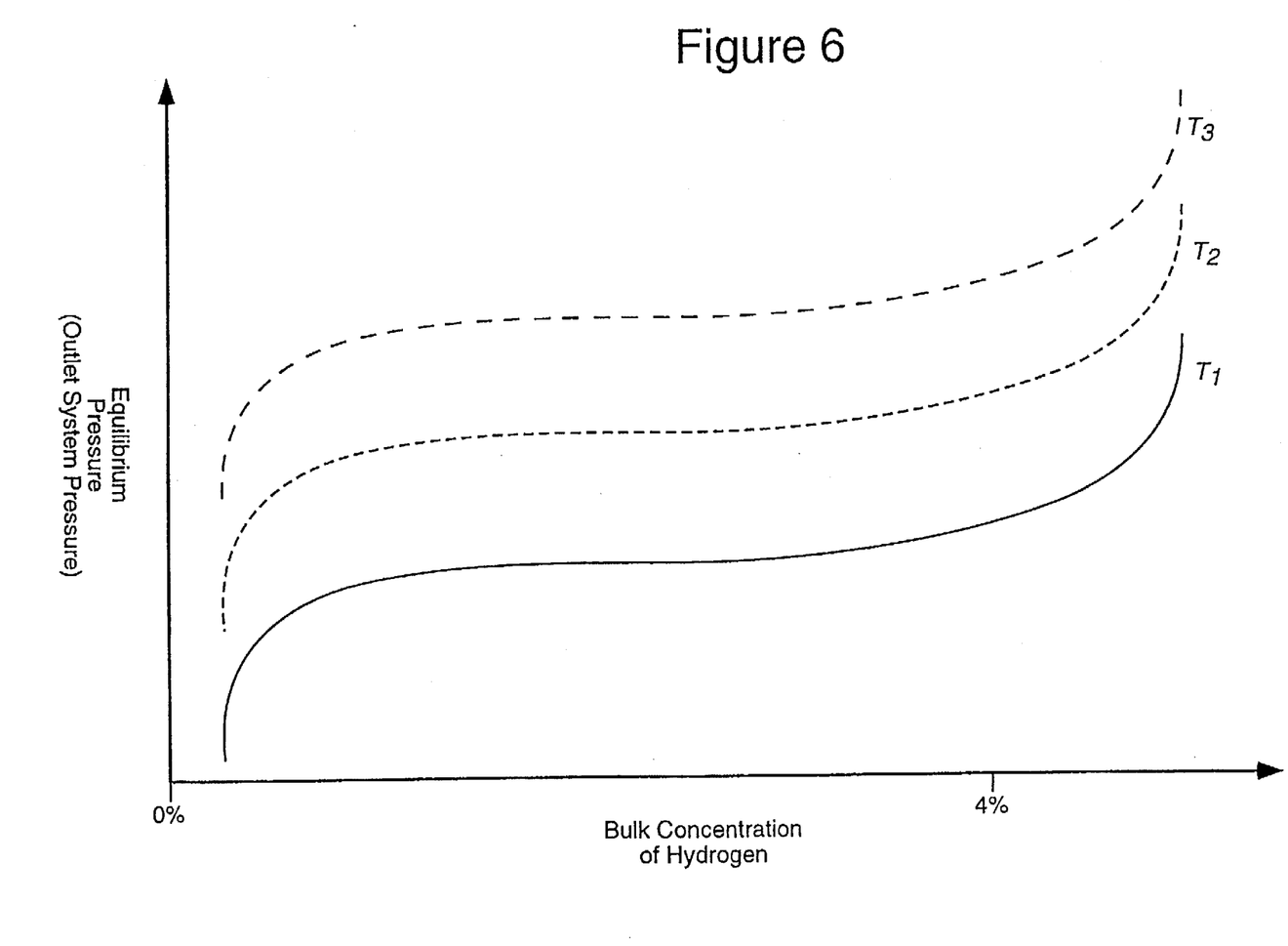
FIG. 6 is a graph illustrating outlet system pressure as a function of bulk concentration of gas.

The hydrogen sorption capacity of the storage matrix materials increases with decreasing temperatures in accordance with the well-known equilibrium relationship between a gas dissolved in a solid and the surface pressure of undissolved gas expressed by Sievert's Law. This relationship is illustrated in FIG. 6 which shows the equilibrium pressure at the gassurface interface as a function of bulk concentration of gas "dissolved" in the solid getter matrix for three different temperatures $T_1$–$T_3$, where $T_3>T_2>T_1$. As indicated by the curves, when the storage matrix is relatively void of hydrogen and is maintained at an appropriate temperature, the equilibrium pressure is low, indicating that a large pressure differential is created between the relatively hot purifier and the cooler, empty storage matrix. As the matrix fills with hydrogen a relatively constant equilibrium pressure is maintained over a range of bulk concentrations of between about 1% to about 4%, after which the equilibrium pressure rises, with bulk concentration. Thus, when the storage matrix is being emptied the equilibrium pressure can be maintained by an appropriate increase in matrix temperature; thereby allowing the pressure of the purified gas to be controlled to a substantial degree by the user and thus overcoming the drawback to palladium-type purifiers so well known in the art. This combination of factors allows for a higher flow rate through the purifier per unit of energy input, providing a more economical method of operating palladium and palladium alloy diffusion separators than heretofore available.

Figure 7:
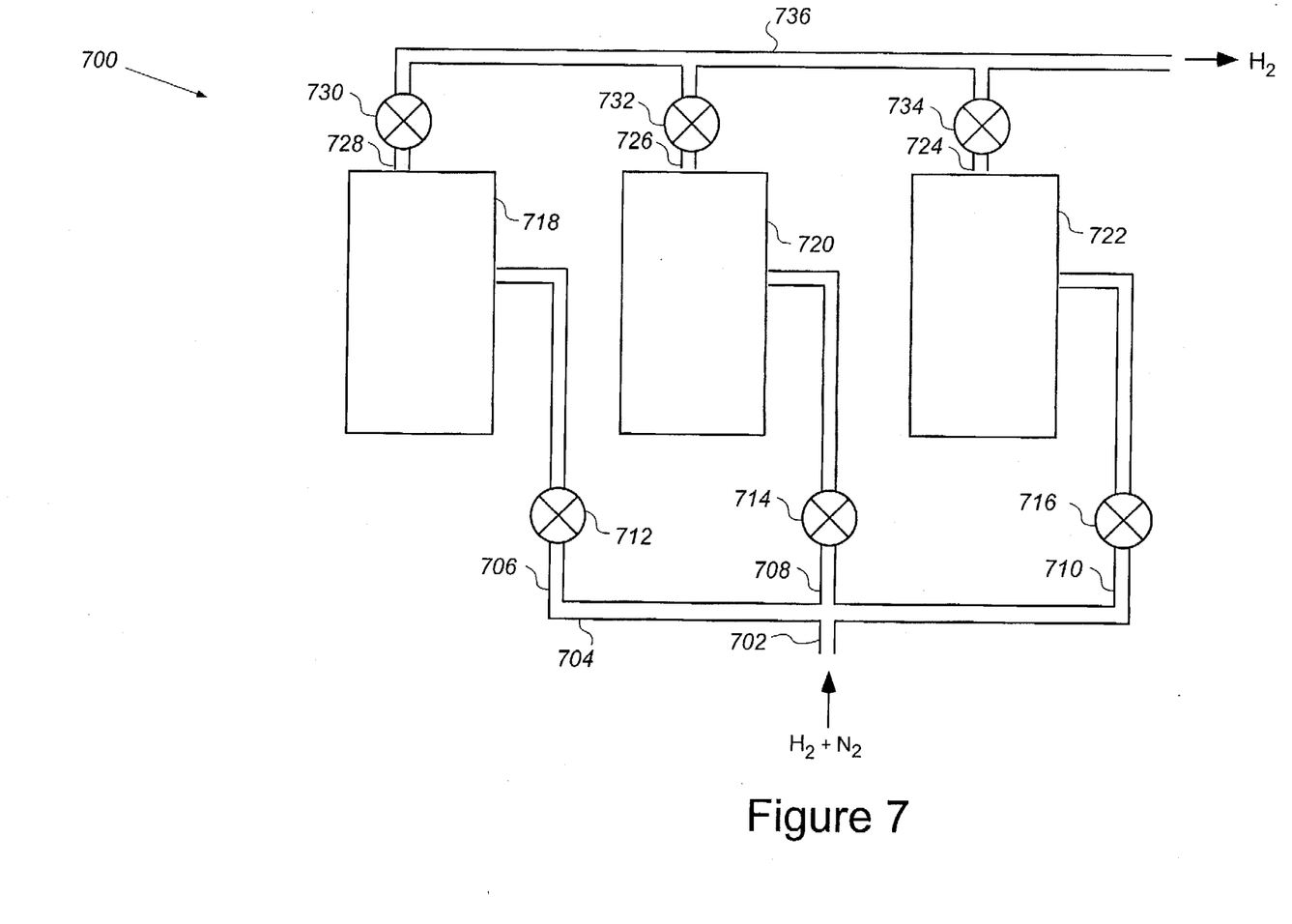
FIG. 7 is an illustration of a bank of apparatuses for purifying hydrogen in accordance with the present invention.

For some applications, it will be preferable to couple two or more of the above-described purification apparatuses in parallel to provide a substantially steady, uninterrupted flow of substantially pure hydrogen gas. Such an embodiment is illustrated in FIG. 7 at 700. There, impure gas enters through inlet 702 and flows through feed line 704 to inlet stems 706, 708 and 710 which include valves 712, 714 and 716, respectively, for selectively introducing the impure gas into purification apparatuses 718, 720 and 722, the detailed description of each of which has been provided above. Each of apparatuses 718, 720 and 722, has an outlet stem 724, 726 and 728, respectively, for supplying substantially purified hydrogen gas to outlet line 736. Outlet stems 724, 726 and 728 further include outlet valves 730, 732 and 734, respectively, to control the release of the substantially purified hydrogen gas from each of the apparatuses 718, 720 and 722. The methods and materials for connecting , operating and maintaining the apparatuses will be apparent to those of skill in the art.

Generally, the tanks will be in various states of depletion, either individually or in groups. To provide a substantially continuous flow of substantially pure hydrogen gas, controllers (not shown) can be used to bring charged tanks on-line as other tanks require recharging. Thus, some apparatuses will be accepting impure gas for purification from feed line 702, while others will be releasing purified gas into outlet line 736. It will also be appreciated that more or fewer apparatuses can be connected in parallel to provide purified hydrogen gas. Methods for controlling the output flow from such connected gas supplies to provide a substantially continuous flow of gas and the means for performing such methods will be apparent to those of skill in the art.

Figure 8:
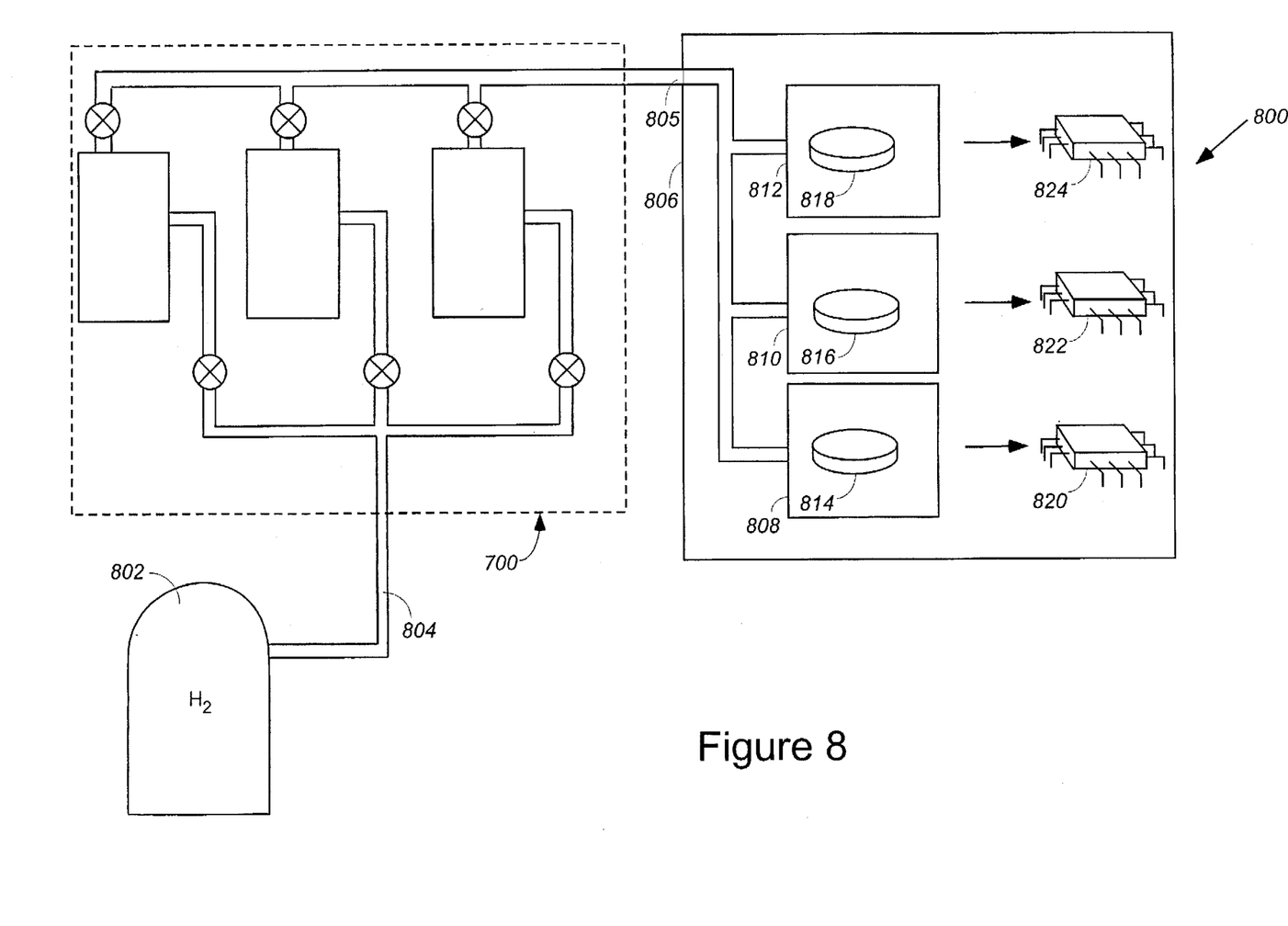
FIG. 8 is an illustration of a semiconductor processing apparatus in accordance with the present invention.

In another aspect, the purification apparatus of the invention can be coupled with a semiconductor wafer processing chamber as illustrated at 800 in FIG. 8. As shown in the Figure, a wafer processing system 800 includes a source of feedstock impure hydrogen to be purified to a substantially purified condition at 802. Such feedstock hydrogen can be hydrogen obtained from conventional sources such as electrolysis or the steam-hydrocarbon reforming process as described above and can be in a largely impure or partially purified state. The feedstock hydrogen is fed through a suitable conduit 804 to a purification/storage system 700, the details of which are described above with respect to FIG. 7, for purification and storage in accordance with the present invention as described herein.

Following processing by purification/storage system 700 the substantially purified hydrogen gas, e.g., hydrogen gas having impurity concentrations of less than about 10 ppb, and even less than about 100 ppt, is fed through a second conduit 805 which is coupled with one or more semiconductor processing chambers 808, 810, and 812 which chambers are housed in a semiconductor production facility 806. (Alternatively one or both of feedstock hydrogen 802 and purification/storage system 700 can be enclosed within the production facility as well.) Facility 806 is of standard design and construction as are processing chambers 808–812. Generally chambers 808–812 will perform one or more semiconductor processing operations on corresponding semiconductor wafers 814–818 which require a source of substantially pure hydrogen. Such processing operations include, but are not limited to, epitaxial fabrication techniques such as those known in the semiconductor processing arts as low-temperature epitaxial, selective epitaxial, and epitaxial on insulator methods. Still other semiconductor processing methods requiring substantially pure hydrogen will be known to those of skill in the semiconductor processing arts. Following the processing of wafers 814–818 additional processing (indicated generally by the arrows in FIG. 8) is performed to produce finished semiconductor devices 820–824.

It will also be appreciated by those of skill in the art that gases comprising hydrogen isotopes (i.e., $D_2$, $T_2$, HD and HT) present substantially the same behavior in all phases of the above described process. Thus, the present invention can be adapted to supplying substantially pure gases comprising hydrogen isotopes without significant modification.

The advantages of the present invention will now become apparent. Using the method and apparatus of the invention substantially pure hydrogen gas can be prepared stored and delivered at desired flow rates with greater energy efficiency than presently available. Thus, the present invention provides a more economical means of supplying high purity hydrogen than known heretofore. In particular, the purified hydrogen gas provided by the method and apparatus described herein can be employed in the production of semiconductor devices.

Although certain embodiments and examples have been used to describe the invention, it will be apparent to those of skill in the art that alterations may be made to the embodiments and examples described herein without departing from the scope or spirit of the invention. For example, the purifier and getter-containing storage matrix can be combined in a variety of configurations that take advantage of the large pressure differential created by the use of getter material as described above. It will also be appreciated that a variety of getter materials, alone or in combination, can comprise the storage matrix. In addition, those having skill in the gas purification arts will further appreciate that the hydrogen purifier can also comprise one or more of the above-described hydrogen purifiers (e.g., a palladium membrane in combination with molecular sieves).

What is claimed:

1. A method of purifying a gaseous mixture containing hydrogen and various gaseous contaminants to produce and store substantially purified hydrogen gas, comprising the steps of:

passing said gaseous mixture through a membrane purifier to produce substantially purified hydrogen gas;

passing said purified hydrogen gas through a porous thermally insulating matrix; and introducing said purified hydrogen gas into a porous storage matrix, said porous storage matrix being comprised of a getter material, under conditions effective to intercalate said purified hydrogen gas into said porous storage matrix to store said substantially purified hydrogen gas.

2. The method of claim 1, wherein said membrane purifier comprises a palladium-containing diffuser separator.

3. The method of claim 2, wherein said palladium-containing diffuser separator comprises palladium or palladium-silver alloy.

4. The method of claim 1, wherein said porous storage matrix is selected from the group consisting of zirconium (Zr), vanadium (V), iron (Fe), titanium (Ti), hafnium (Hf), uranium (U), thorium (Th), tungsten (W), tantalum (Ta), niobium (Nb), aluminum (Al) and alloys thereof.

5. The method of claim 4, wherein said getter comprises a ternary zirconium-vanadium-iron alloy having a weight composition such that the percentages of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe.

6. The method of claim 5, wherein said ternary zirconium-vanadium-iron alloy comprises about 70% Zr, about 24.6% V and about 5.4% Fe by weight.

7. The method of claim 4, wherein said getter comprises a zirconium-iron alloy.

8. The method of claim 7, wherein said zirconium-iron alloy comprises between about 15% to about 30% by weight of Fe and between about 70% to about 85% by weight Zr.

9. The method of claim 4, wherein said getter comprises a zirconium-aluminum alloy having a composition of about 84% zirconium and about 16% aluminum by weight.

10. A method for producing a stream of substantially pure hydrogen gas at a substantially constant pressure, comprising the steps of:

charging a plurality of hydrogen purifiers with a gaseous mixture containing hydrogen gas and gaseous impurities, said hydrogen purifiers including membrane purification means for substantially purifying said gaseous mixture to produce substantially pure hydrogen gas coupled with a porous storage matrix including a getter material, said porous storage matrix being effective to intercalate said substantially pure hydrogen gas therein to store said substantially purified hydrogen gas; and means for substantially thermally isolating said means for substantially purifying said gaseous mixture from said porous storage matrix, to form thereby a plurality of hydrogen purifiers having substantially purified hydrogen gas stored therein; and releasing substantially pure hydrogen gas from certain of said hydrogen purifiers and charging certain other of said hydrogen purifiers under conditions effective to generate a stream of substantially pure hydrogen gas at a substantially constant pressure.

11. The method of claim 10, wherein said membrane purification comprises a palladium-containing diffuser separator.

12. The method of claim 11, wherein said diffuser includes palladium or palladium-silver alloy.

13. The method of claim 12, wherein said diffuser includes palladium.

14. The method of claim 12, wherein said diffuser includes a palladium-silver alloy.

15. The method of claim 10, wherein said porous storage matrix is selected from the group consisting of zirconium (Zr), vanadium (V), iron (Fe), titanium (Ti), hafnium (Hf), uranium (U), thorium (Th), tungsten (W), tantalum (Ta), niobium (Nb), aluminum (Al) and alloys thereof.

16. The method of claim 15, wherein said getter comprises a ternary zirconium-vanadium-iron alloy having a weight composition such that the percentages of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe.

17. The method of claim 16, wherein said ternary zirconium-vanadium-iron alloy comprises about 70% Zr, about 24.6% V and about 5.4% Fe by weight.

18. The method of claim 15, wherein said getter comprises a zirconium-iron alloy.

19. The method of claim 18, wherein said zirconium-iron alloy comprises between about 15% to about 30% by weight of Fe and between about 70% to about 85% by weight Zr.

20. The method of claim 15, wherein said getter comprises a zirconium-aluminum alloy having a composition of about 84% zirconium and about 16% aluminum by weight.

21. A method for producing a semiconductor device, comprising the steps of:

purifying a gaseous mixture containing hydrogen and various gaseous contaminants to produce and store substantially purified hydrogen gas by passing said gaseous mixture through a membrane purifier to produce substantially purified hydrogen gas, passing said purified hydrogen gas through a porous thermally insulating matrix, and introducing said substantially purified hydrogen gas into a porous storage matrix, said porous storage matrix being comprised of a getter material, under conditions effective to intercalate said purified hydrogen gas into said porous storage matrix to store said substantially purified hydrogen gas;

introducing said substantially purified hydrogen gas into a semiconductor wafer processing chamber; and processing a semiconductor wafer in said semiconductor wafer processing chamber to produce thereby a semiconductor device.

22. The method of claim 21, wherein said membrane purifier comprises a palladium-containing diffuser separator.

23. The method of claim 22, wherein said palladium-containing diffuser separator comprises palladium or palladium-silver alloy.

24. The method of claim 21, wherein said porous storage matrix is selected from the group consisting of zirconium (Zr), vanadium (V), iron (Fe), titanium (Ti), hafnium (Hf), uranium (U), thorium (Th), tungsten (W), tantalum (Ta), niobium (Nb), aluminum (Al) and alloys thereof.

25. The method of claim 24, wherein said getter comprises a ternary zirconium-vanadium-iron alloy having a weight composition such that the percentages of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe.

26. The method of claim 25, wherein said ternary zirconium-vanadium-iron alloy comprises about 70% Zr, about 24.6% V and about 5.4% Fe by weight.

27. The method of claim 24,wherein said getter comprises a zirconium-iron alloy.

28. The method of claim 27, wherein said zirconium-iron alloy comprises between about 15% to about 30% by weight of Fe and between about 70% to about 85% by weight Zr.

29. The method of claim 24, wherein said getter comprises a zirconium-aluminum alloy having a composition of about 84% zirconium and about 16% aluminum by weight.

30. A hydrogen gas purifying and storage system for purifying a gaseous mixture containing hydrogen and various gaseous contaminants and storing a substantially purified hydrogen gas, said purifying and storage system comprising:

a hydrogen membrane purifier effective to provide substantially purified hydrogen gas from said gaseous mixture;

a porous storage matrix including a getter material, said porous storage matrix being in gaseous communication with said hydrogen membrane purifier; and means for substantially thermally isolating said hydrogen membrane purifier from said porous storage matrix.

31. The system of claim 30, wherein said membrane purifier comprises a palladium-containing diffuser separator.

32. The system of claim 31, wherein said palladium-containing diffuser separator comprises palladium or palladium-silver alloy.

33. The system of claim 32, wherein said palladium-containing diffuser separator comprises palladium.

34. The system of claim 32, wherein said palladium-containing diffuser separator comprises palladium-silver alloy.

35. The system of claim 30, further including means for maintaining said hydrogen purifier at a first temperature.

36. The system of claim 30, further including means for maintaining said porous storage matrix at a second temperature.

37. The system of claim 30, wherein said means for substantially thermally isolating said hydrogen purifier comprises a porous thermally insulating matrix in gaseous communication with both said hydrogen purifier and said porous storage matrix.

38. The system of claim 37, wherein said porous thermally insulating matrix is porous quartz.

39. The system of claim 30, wherein said porous storage matrix is selected from the group consisting of zirconium (Zr), vanadium (V), iron (Fe), titanium (Ti), hafnium (Hf), uranium (U), thorium (Th), tungsten (W), tantalum (Ta), niobium (Nb), aluminum (Al) and alloys thereof.

40. The system of claim 39, wherein said getter comprises a ternary zirconium-vanadium-iron alloy having a weight composition such that the percentages of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe.

41. The system of claim 40, wherein said ternary zirconium-vanadium-iron alloy comprises about 70% Zr, about 24.6% V and about 5.4% Fe by weight.

42. The system of claim 39, wherein said getter comprises a zirconium-iron alloy.

43. The system of claim 42, wherein said zirconium-iron alloy comprises between about 15% to about 30% by weight of Fe and between about 70% to about 85% by weight Zr.

44. The system of claim 39, wherein said getter comprises a zirconium-aluminum alloy having a composition of about 84% zirconium and about 16% aluminum by weight.

45. A system for providing a stream of substantially pure hydrogen gas at a substantially constant pressure, said system comprising:

a gas inlet for receiving a gaseous mixture containing hydrogen gas and gaseous impurities; said gas inlet being coupled with a gas outlet for releasing substantially purified hydrogen gas coupled with each said hydrogen purifiers;

a plurality of hydrogen purifiers for purifying said gaseous mixture and storing substantially pure hydrogen gas, said hydrogen purifiers including a membrane purifier for substantially purifying said gaseous mixture to produce substantially pure hydrogen gas coupled with a porous storage matrix including a getter material, said porous storage matrix being effective to intercalate said substantially pure hydrogen gas therein to store said substantially purified hydrogen gas; and means for substantially thermally isolating said membrane purifier from said porous storage matrix;

inlet valve means coupled with each of said hydrogen purifiers and said gas inlet for selectively introducing said gaseous mixture to each of said plurality of hydrogen purifiers; and outlet valve means coupled with each of said hydrogen purifiers and said gas outlet for introducing said substantially purified gas to said gas outlet.

46. The system of claim 45, wherein said membrane purifier comprises a palladium-containing diffuser separator.

47. The system of claim 46, wherein said diffuser includes palladium or palladium-silver alloy.

48. The system of claim 47, wherein said diffuser includes palladium.

49. The system of claim 47, wherein said diffuser includes a palladium-silver alloy.

50. The method of claim 45, wherein said porous storage matrix is selected from the group consisting of zirconium (Zr), vanadium (V), iron (Fe), titanium (Ti), hafnium (Hf), uranium (U), thorium (Th), tungsten (W), tantalum (Ta), niobium (Nb), aluminum (Al) and alloys thereof.

51. The system of claim 50, wherein said getter comprises a ternary zirconium-vanadium-iron alloy having a weight composition such that the percentages of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe.

52. The system of claim 51, wherein said ternary zirconium-vanadium-iron alloy comprises about 70% Zr, about 24.6% V and about 5.4% Fe by weight.

53. The system of claim 50, wherein said getter comprises a zirconium-iron alloy.

54. The system of claim 53, wherein said zirconium-iron alloy comprises between about 15% to about 30% by weight of Fe and between about 70% to about 85% by weight Zr.

55. The system of claim 50, wherein said getter comprises a zirconium-aluminum alloy having a composition of about 84% zirconium and about 16% aluminum by weight.

56. A semiconductor device fabrication system, comprising: a hydrogen gas purifying and storage system for purifying a gaseous mixture containing hydrogen and various gaseous contaminants and storing a substantially purified hydrogen gas, said purifying and storage system including a hydrogen membrane purifier effective to provide substantially purified hydrogen gas from said gaseous mixture, said hydrogen purifier being in gaseous communication with a porous storage matrix, said porous storage matrix being comprised of a getter material, and means for substantially thermally isolating said hydrogen purifier from said porous storage matrix; and said hydrogen gas purifying and storage system being fluidly coupled with a semiconductor wafer processing chamber which is configured to process a semiconductor wafer in an atmosphere including said substantially purified hydrogen gas to produce thereby a semiconductor device.

57. The system of claim 56, wherein said membrane purifier comprises a palladium-containing diffuser separator.

58. The system of claim 57, wherein said palladium-containing diffuser separator comprises palladium or palladium-silver alloy.

59. The system of claim 58, wherein said palladium-containing diffuser separator comprises palladium.

60. The system of claim 58, wherein said palladium-containing diffuser separator comprises palladium-silver alloy.

61. The system of claim 56, further including means for maintaining said hydrogen purifier at a first temperature.

62. The system of claim 56, further including means for maintaining said porous storage matrix at a second temperature.

63. The system of claim 56, wherein said means for substantially thermally isolating said hydrogen purifier comprises a porous thermally insulating matrix in gaseous communication with both said hydrogen purifier and said porous storage matrix.

64. The system of claim 63, wherein said porous thermally insulating matrix is porous quartz.

65. The system of claim 56, wherein said porous storage matrix is selected from the group consisting of zirconium (Zr), vanadium (V), iron (Fe), titanium (Ti), hafnium (Hf), uranium (U), thorium (Th), tungsten (W), tantalum (Ta), niobium (Nb), aluminum (Al), and alloys thereof.

66. The system of claim 65, wherein said getter comprises a ternary zirconium-vanadium-iron alloy having a weight composition such that the percentages of weights of the three elements when plotted on a ternary composition diagram fall within a triangle the vertices of which lie at about (a) 75% Zr/ 20% V/ 5% Fe; (b) 45% Zr/ 20% V/ 35% Fe; and (c) 45% Zr/ 50% V/ 5% Fe.

67. The system of claim 66, wherein said ternary zirconium-vanadium-iron alloy comprises about 70% Zr, about 24.6% V and about 5.4% Fe by weight.

68. The system of claim 65, wherein said getter comprises a zirconium-iron alloy.

69. The system of claim 68, wherein said zirconium-iron alloy comprises between about 15% to about 30% by weight of Fe and between about 70% to about 85% by weight Zr.

70. The system of claim 65, wherein said getter comprises a zirconium-aluminum alloy having a composition of about 84% zirconium and about 16% aluminum by weight.

* * * * *

UNITED STATES PATENT AND TRADEMARK OFFICE
CERTIFICATE OF CORRECTION

PATENT NO. : 5,895,519  
DATED : April 20, 1999  
INVENTOR(S) : D'Arcy Lorimer

Page 1 of 1

It is certified that error appears in the above-identified patent and that said Letters Patent is hereby corrected as shown below:

Column 5,
Line 21, please delete "sorted purified hystored"

Column 8,
Line 51, please replace "wellknown" with -- well-known --
Line 66, please replace "gassurface" with -- gas-surface --

Signed and Sealed this

Twenty-first Day of August, 2001

*Attest:*

*Attesting Officer*

NICHOLAS P. GODICI
*Acting Director of the United States Patent and Trademark Office*